(12) United States Patent
Shibata et al.

(10) Patent No.: US 12,134,684 B2
(45) Date of Patent: Nov. 5, 2024

(54) METHOD FOR PRODUCING CELLULOSE BEADS

(71) Applicant: DAICEL CORPORATION, Osaka (JP)

(72) Inventors: Toru Shibata, Tokyo (JP); Hiromichi Okura, Tokyo (JP)

(73) Assignee: DAICEL CORPORATION, Osaka (JP)

(*) Notice: Subject to any disclaimer, the term of this patent is extended or adjusted under 35 U.S.C. 154(b) by 625 days.

(21) Appl. No.: 17/297,322

(22) PCT Filed: Nov. 26, 2019

(86) PCT No.: PCT/JP2019/046243
§ 371 (c)(1),
(2) Date: May 26, 2021

(87) PCT Pub. No.: WO2020/121805
PCT Pub. Date: Jun. 18, 2020

(65) Prior Publication Data
US 2022/0025131 A1  Jan. 27, 2022

(30) Foreign Application Priority Data
Dec. 12, 2018  (JP) .................. 2018-232337

(51) Int. Cl.
*C08J 3/16* (2006.01)
(52) U.S. Cl.
CPC .......... *C08J 3/16* (2013.01); *C08J 2301/02* (2013.01)
(58) Field of Classification Search
CPC .................. C08J 3/16; C08J 2301/02
See application file for complete search history.

(56) References Cited

U.S. PATENT DOCUMENTS

| 5,245,024 A | 9/1993 | Scarpa et al. |
| 2013/0331563 A1 | 12/2013 | Kawai et al. |

(Continued)

FOREIGN PATENT DOCUMENTS

| CN | 103415535 A | 11/2013 |
| JP | 2011-231152 A | 11/2011 |
| JP | 2013-133355 A | 7/2013 |

(Continued)

OTHER PUBLICATIONS

International Search Report (PCT/ISA/210) issued in PCT/JP2019/046243 mailed on Feb. 18, 2020.

(Continued)

*Primary Examiner* — Ling Siu Cho
*Assistant Examiner* — Andrea Wu
(74) *Attorney, Agent, or Firm* — Birch, Stewart, Kolasch & Birch, LLP

(57) ABSTRACT

Provided is a novel method for producing cellulose beads, the method being capable of suitably producing spherical cellulose beads. The method for producing cellulose beads includes: (Step 1) preparing a coagulating bath having a first liquid medium phase and a second liquid medium phase; (Step 2) forming a particulate cellulose solution in the first liquid medium phase by supplying a cellulose solution to the first liquid medium phase of the coagulating bath; and (Step 3) coagulating the particulate cellulose solution by supplying the particulate cellulose solution in the first liquid medium phase to the second liquid medium phase.

8 Claims, 3 Drawing Sheets

(56) References Cited

U.S. PATENT DOCUMENTS

2015/0297820 A1   10/2015   Kawai et al.
2018/0221843 A1   8/2018   Wakisaka et al.

FOREIGN PATENT DOCUMENTS

WO   WO2014/038686 A1   3/2014
WO   WO2016/031695 A1   3/2016

OTHER PUBLICATIONS

Written Opinion (PCT/ISA/237) issued in PCT/JP2019/046243 mailed on Feb. 18, 2020.
Extended European Search Report for corresponding European Application No. 19897104.6, dated Jan. 14, 2022.
Ganesan et al., "Review on the Production of Polysaccharide Aerogel Particles," Materials, vol. 11, No. 2144, 2018, pp. 1-37.
Chinese Office Action for Chinese Application No. 201980078645.8, dated Jul. 5, 2022.

METHOD FOR PRODUCING CELLULOSE BEADS

TECHNICAL FIELD

The present disclosure relates to a method for producing cellulose beads.

BACKGROUND ART

Polysaccharides represented by cellulose, and derivatives thereof are used in a variety of applications. For example, these microporous materials themselves can serve as adsorbents, and when the surface of these microporous materials is subjected to some sort of chemical modification, functions such as adsorption, separation, and catalytic functions can be imparted.

In recent years, through the widespread use of enzymes and the development of biopharmaceuticals, the separation and purification of biopolymers such as proteins has become an important technical issue to be addressed. Chromatography is an important means for solving this issue. Chromatography uses a separating agent in which a certain atomic group (often referred to as a ligand) that interacts with a targeted material or an impurity to be removed is bonded to a solid referred to as a matrix.

The lack of non-specific adsorption of proteins is a crucial property of a material for separating biopolymers, and therefore polysaccharides are valued for use as a matrix. In addition, the presence of a large number of hydroxyl groups in the molecules of polysaccharides allows ligands to be readily bonded through ether bonds or ester bonds using the hydroxyl groups as a scaffold, and this is also an important factor that makes polysaccharides valued for use as a matrix.

To separate and purify a biopolymer, a method is generally used in which a ligand with some affinity to a molecule of interest is bonded to the matrix, and after the molecule of interest has been adsorbed, the adsorbed molecule of interest is released and collected in some manner. In order to obtain a large amount of the molecule of interest, the matrix must be able to bind a large amount of ligands. Furthermore, in order to allow interaction with good efficiency between the ligands and a biopolymer having a large molecular weight, the matrix must also be provided with a porous structure that allows the molecules of interest to freely enter and exit. In other words, when the matrix is packed into a column and size exclusion chromatography is performed, the matrix must exhibit an exclusion limit that is greater than the combined size of the molecule to be purified and the ligand.

Such matrices are often used by being packed as particles into a tube called a column.

Factors for the ease of use of such matrices include the magnitude of physical strength, as well as selectivity for the to-be-separated material. That is, when a liquid or gas is passed during chromatography or filtration, a matrix having a low elastic modulus is subjected to compressive deformation and breakage, and as a result, the flow of liquid in the chromatographic column becomes uneven, and clogging may occur, leading to a significant reduction in the separation efficiency of the column. The magnitude of the physical strength is an important property, and in this respect, cellulose is an outstanding material among polysaccharides.

Additionally, as a general characteristic of polysaccharides, cellulose has an alcoholic hydroxyl group on the surface, and therefore cellulose provides advantages such as the ability to bond various atomic groups through chemical reactions, and the ability to procure high purity materials in abundance at a relatively low cost.

For the above reasons, porous cellulose media have been developed for the main purpose of the separation and purification of biopolymers. As a method for producing these porous cellulose media, a method of dissolving cellulose in some manner, followed by regeneration, is known. On the other hand, several methods that use an organic acid ester as a starting material are also known. The direct dissolution of cellulose itself can be difficult in that a special solvent is required or the viscosity of the solution is very high, whereas a method that uses an organic acid ester can exploit various advantages, such as the ability to dissolve organic acid esters of cellulose in many solvents, the ability to industrially supply organic acid esters of cellulose with stable quality at various bonding rates or degrees of polymerization with various organic acids, and the ability to readily decompose ester bonds to regenerate cellulose.

As a method for producing porous cellulose beads, Patent Document 1, for example, discloses a method in which a cellulose dispersion produced by mixing a low temperature alkaline aqueous solution with a raw cellulose powder is made to contact a coagulation solvent.

CITATION LIST

Patent Document

Patent Document 1: WO 2014/038686
Patent Document 2: JP 2013-133355 A
Patent Document 3: JP 2011-231152 A

SUMMARY OF DISCLOSURE

Technical Problem

For example, according to the method for producing cellulose beads described in Patent Document 1, it is necessary to coagulate an emulsion of a cellulose dispersion containing an alkaline aqueous solution and generate cellulose beads by adding a coagulation solvent such as methanol to the emulsion of the cellulose dispersion. Therefore, a problem with the production method disclosed in Patent Document 1 is that a large number of cellulose beads having irregular shapes are produced, and it is difficult to produce spherical cellulose beads. Furthermore, as is also found in the examples of Patent Document 1, in order to stabilize the dispersion state when dispersing a cellulose solution in a liquid medium, ordinarily a liquid medium having a high viscosity and a specific gravity that is close to that of the cellulose solution must be selected, and a dispersion stabilizer such as a sorbitan ester must be added. As a result, problems have remained such as the need to use a halogen-containing liquid medium as the medium, and an increase in the burden of washing and removing the medium or the dispersion stabilizer.

In addition, Patent Document 2 discloses a method for producing cellulose beads, and according to that method, a liquid obtained by dissolving cellulose in a mixed aqueous solution of an alkali and urea or thiourea is atomized and supplied to a coagulation liquid. However, such a method results in various problems. Namely, atomizing this type of alkaline liquid through spraying causes the alkaline liquid to be scattered around, results in a large distribution of particle diameters, and results in irregular shapes of the particles that are produced when the distance between the spray and the coagulation liquid is short.

In light of such circumstances, a primary object of the present disclosure is to provide a novel method for producing cellulose beads, the method being capable of suitably producing spherical cellulose beads.

Solution to Problem

The inventors of the present disclosure conducted diligent research to solve the problems described above. As a result, the inventors discovered that spherical cellulose beads can be suitably produced according to a method for producing cellulose beads including: (Step 1) preparing a coagulating bath having a first liquid medium phase and a second liquid medium phase; (Step 2) forming a particulate (spherical) cellulose solution in the first liquid medium phase by supplying a cellulose solution to the first liquid medium phase of the coagulating bath; (Step 3) coagulating the particulate cellulose solution by supplying the particulate cellulose solution in the first liquid medium phase to the second liquid medium phase. The present disclosure was achieved through further examinations based on these findings.

First Aspect. A method for producing cellulose beads including:

(Step 1) preparing a coagulating bath having a first liquid medium phase and a second liquid medium phase;

(Step 2) forming a particulate cellulose solution in the first liquid medium phase by supplying a cellulose solution to the first liquid medium phase of the coagulating bath; and (Step 3) coagulating the particulate cellulose solution by supplying the particulate cellulose solution in the first liquid medium phase to the second liquid medium phase.

Second Aspect. The method for producing cellulose beads according to the first aspect, wherein the first liquid medium phase and the second liquid medium phase are in contact with one another in the coagulating bath.

Third Aspect. The method for producing cellulose beads according to the first or second aspect, wherein Step 2 and Step 3 are implemented simultaneously.

Fourth Aspect. The method for producing cellulose beads according to any one of the first to third aspects, wherein in Step 2, the cellulose solution is supplied from a tip of a nozzle to the first liquid medium phase.

Fifth Aspect. The method for producing cellulose beads according to the fourth aspect, wherein the tip of the nozzle is present in the first liquid medium phase.

Sixth Aspect. The method for producing cellulose beads according to any one of the first to fifth aspects, wherein in the coagulating bath, the first liquid medium phase is an upper layer, and the second liquid medium phase is a lower layer; and in Step 3, the particulate cellulose solution in the first liquid medium phase is supplied to the second liquid medium phase through gravitational force.

Advantageous Effects of Disclosure

According to the present disclosure, a novel method for producing cellulose beads can be provided, the method being capable of suitably producing spherical cellulose beads.

DESCRIPTION OF EMBODIMENTS

Figure 1:
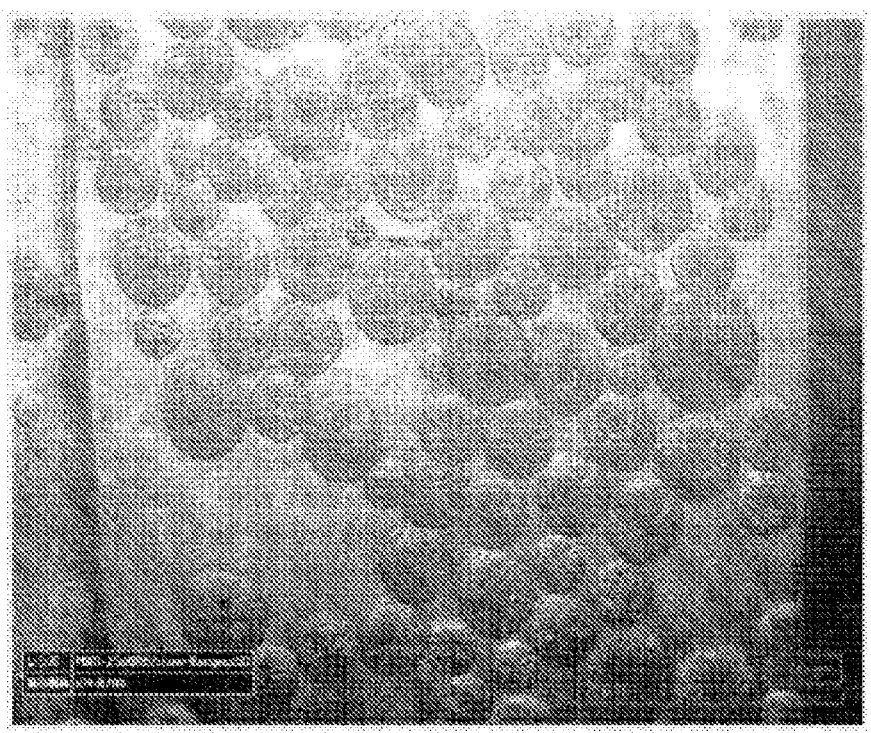
FIG. 1 is an electron micrograph image of cellulose beads obtained in Example 1.

The method for producing cellulose beads according to an embodiment of the present disclosure is characterized by being provided with at least Step 1 of preparing a coagulating bath having a first liquid medium phase and a second liquid medium phase, Step 2 of forming a particulate cellulose solution in the first liquid medium phase by supplying a cellulose solution to the first liquid medium phase of the coagulating bath, and Step 3 of coagulating the particulate cellulose solution by supplying the particulate cellulose solution of the first liquid medium phase to the second liquid medium phase. By satisfying these configurations, the method for producing cellulose beads according to an embodiment of the present disclosure can suitably produce spherical cellulose beads. The method for producing cellulose beads according to an embodiment of the present disclosure is described below in detail.

Step 1

In Step 1 of the method for producing cellulose beads according to an embodiment of the present disclosure, a coagulating bath having a first liquid medium phase and a second liquid medium phase is prepared. As described below, in the present disclosure, the coagulating bath need only have at least a first liquid medium phase and a second liquid medium phase, but may also be provided with another liquid medium phase that differs from the first liquid medium phase and the second liquid medium phase.

In the coagulating bath, the first liquid medium phase is constituted by a liquid medium having low miscibility with a below-described cellulose solution. In Step 2 described below, when the cellulose solution is supplied to the first liquid medium phase, a particulate cellulose solution is formed. In other words, the liquid medium constituting the first liquid medium phase constitutes a dispersion medium of the cellulose solution. Furthermore, the second liquid medium phase is constituted by a liquid medium that coagulates the cellulose contained in the cellulose solution. When the particulate cellulose solution in the first liquid medium phase is supplied to the second liquid medium phase, the cellulose solution contacts the liquid medium constituting the second liquid medium phase, the cellulose coagulates, and cellulose beads are produced. In other words, the liquid medium constituting the second liquid medium phase functions as a coagulation solvent. The cellulose beads produced by a production method according to an embodiment of the present disclosure differ depending on the constitutions of the cellulose solution, the first liquid medium phase, and the second liquid medium phase, but are usually porous cellulose beads.

The liquid medium constituting the first liquid medium phase is not particularly limited as long as the liquid medium has low miscibility with the cellulose solution described below, and for example, a liquid medium known as a dispersion medium for forming an emulsion of a cellulose solution can be used. As described below, for a case in which droplets of the cellulose solution are delivered to the second liquid medium phase through dropping by weight without stirring, and for a case in which the nozzle is immersed in the first liquid medium phase, a low viscosity and low specific gravity liquid is more preferable than a high viscosity and high specific gravity liquid that is commonly used. Examples of such a liquid include hydrocarbons having 10 or fewer carbons, and more preferably saturated hydrocarbons. From the perspectives of handling ease and safety, hydrocarbons with 5 or more carbons including pentane, hexane, heptane, octane, nonane, and decane are preferable. In addition, diethyl ether, methyl tert-butyl ether, methyl acetate, ethyl acetate, and butyl acetate are similarly preferable. However, as described below, the combination with the second liquid medium phase must form two phases.

In addition, with a typical method for producing cellulose beads, a dispersion stabilizer (surfactant) is added to the liquid medium, and examples of the dispersion stabilizer include sorbitan fatty acid esters such as sorbitan laurate, sorbitan stearate, sorbitan oleate, and sorbitan trioleate, glycerin fatty acid esters, and polyglycerin fatty acid esters. For example, as disclosed in Patent Document 3, in a typical and commonly used method in which a water-in-oil emulsion is formed and then contacted with a coagulated liquid, even if the disclosure indicates that a dispersion stabilizer may be preferably added, such addition is essential in order to substantially suppress re-aggregation of the droplets. However, in the present disclosure, droplets of the cellulose solution can be transferred to the second liquid medium phase in parallel with the supply of the droplets of the cellulose solution to the first liquid medium phase, and in this case, the density of the droplets in the first liquid medium phase is kept low, and the probability of deformation or collision fusion due to contact between droplets is reduced. For this reason, it is not always necessary to add a dispersion stabilizer, and as a result, the cost of the dispersion stabilizer becomes unnecessary, and it becomes significantly easier to separate and wash the produced beads. Therefore, in the present disclosure, Step 2 and Step 3 described below are preferably implemented simultaneously. Furthermore, the dispersion stabilizer (surfactant) need not be added to the first liquid medium phase.

The liquid medium constituting the second liquid medium is not particularly limited as long as two phases are formed when the second liquid medium contacts the first liquid medium, and as long as the cellulose in the cellulose solution is coagulated when the liquid medium contacts the cellulose solution, and for example, a liquid medium that is known as a coagulation solvent for a cellulose solution can be used.

Specific examples of the liquid medium constituting the second liquid medium phase include water and alcohols, and in particular, compared to the use of water, the use of an alcohol can result in smaller pores in the cellulose beads that are produced. Moreover, sphericity is improved when an alcohol is used, and thus use of an alcohol is preferable. Further, when a mixed solvent of water and an alcohol is used, the size of the pores of the cellulose beads can be optionally adjusted through the mixing ratio. The liquid medium constituting the second liquid medium phase may be one type, or may be two or more types.

The alcohol is not particularly limited, but an alcohol having 6 or fewer carbons is preferable, an alcohol having 4 or fewer carbons is more preferable, and methanol is most preferable. The liquid medium constituting the second liquid medium phase may be an alcohol aqueous solution.

The liquid medium constituting the second liquid medium phase is preferably acidic. When the liquid medium is mainly water, it is preferable to make the liquid medium acidic to thereby neutralize the alkalinity of the cellulose solution described below and induce rapid coagulation. The component that is used to make the liquid medium acidic is not particularly limited, and inorganic acids such as sulfuric acid and hydrochloric acid, organic acids such as acetic acid, citric acid, and tartaric acid, and components having a buffering effect such as phosphoric acid and carbonic acid can be widely used. Note that the matter of the liquid medium constituting the second liquid medium phase being acidic means that the pH of the liquid medium is less than 7.0. This pH is preferably 5.0 or less, more preferably 4.0 or less, even more preferably 3.0 or less, and particularly preferably 2.0 or less. The lower limit of the pH is not particularly limited, but the pH is preferably not less than 0.0. In addition, when the liquid medium is mainly water, the addition of a salt is also desirable because such addition induces rapid coagulation. Examples of such salts include sodium chloride, sodium sulfate, acidic sodium sulfate, ammonium chloride, and ammonium sulfate.

Figure 3:
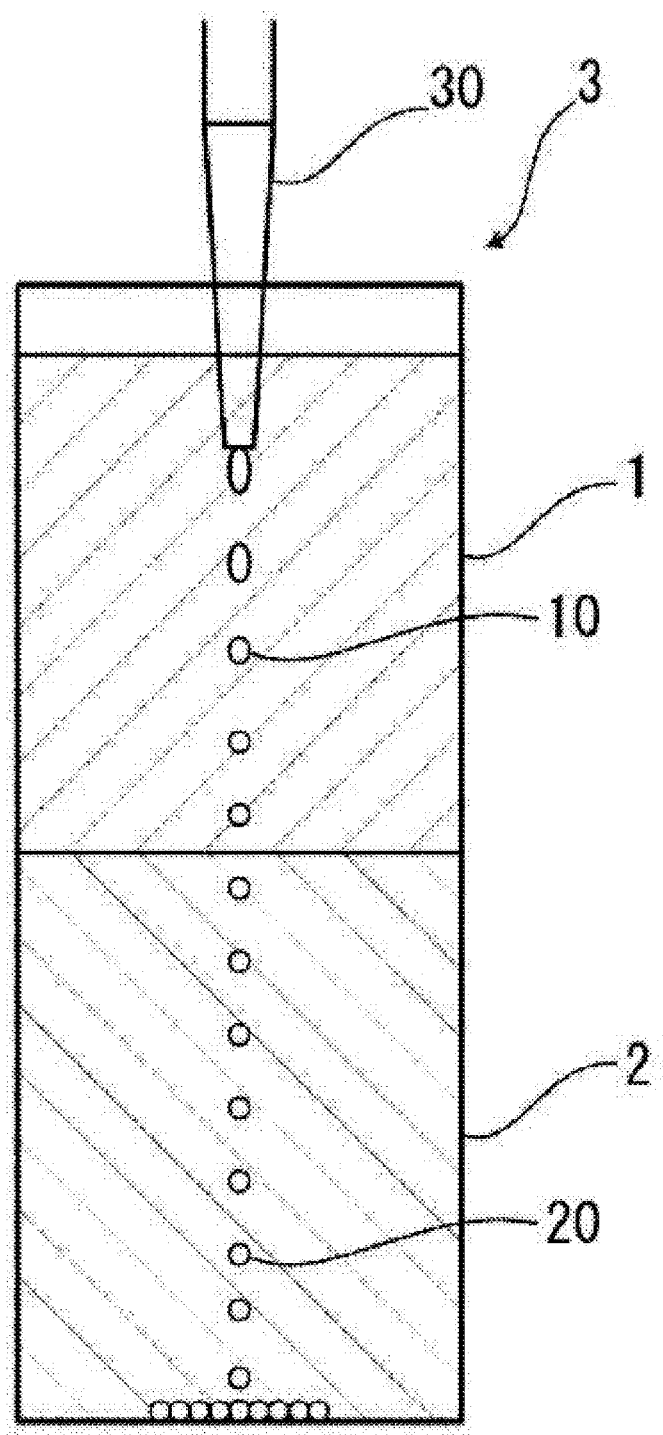
FIG. 3 is a schematic view for explaining the method for producing cellulose beads of the present disclosure.

As illustrated in the schematic view of FIG. 3, for example, in a coagulating bath 3, a first liquid medium phase 1 is preferably an upper layer, and a second liquid medium phase 2 is preferably a lower layer. By configuring in this manner, in Step 3 described below, a particulate cellulose solution 10 of the first liquid medium phase 1 can be suitably supplied through gravitational force to the second liquid medium phase 2. Specifically, by configuring the coagulating bath 3 from the cellulose solution 10, the second liquid medium phase 2, and the first liquid medium phase 1 in order of highest specific gravity, the cellulose solution 10 supplied to the first liquid medium phase 1 freely drops through gravitational force, and moves from the first liquid medium phase 1 to the second liquid medium phase 2, and cellulose beads 20 are produced As illustrated in the schematic view of FIG. 3, in the coagulating bath 3, the first liquid medium phase 1 and the second liquid medium phase 2 are preferably in contact. By contacting the first liquid medium phase 1 and the second liquid medium phase 2, the particulate cellulose solution 10 formed in the first liquid medium phase 1 can be rapidly supplied to the second liquid medium phase 2. Another liquid medium phase may be provided between the first liquid medium phase 1 and the second liquid medium phase 2.

For cases in which the first liquid medium phase 1 and the second liquid medium phase 2 are brought into contact with each other, liquid media having low miscibility are used as the liquid media constituting the first liquid medium phase 1 and the second liquid medium phase 2. The liquid media with low miscibility can each be selected, as appropriate, from those described above. In addition, when the first liquid medium phase 1 is used as an upper layer and the second liquid medium phase 2 is used as a lower layer, a liquid medium having a specific gravity that is smaller than that of the liquid medium constituting the second liquid medium phase 2 is preferably selected as the liquid medium constituting the first liquid medium phase 1. Such liquid media can each be selected, as appropriate, from those described above. Note that the first liquid medium phase and the second liquid medium phase are often partially miscible with each other. The degree of miscibility may have some effect on the shape and microstructure of the particles, but the degree of intermiscibility can be adjusted by making each phase a mixed solution or adding salts, etc., and thus the shape and microstructure of the particles can be adjusted. Further, even a combination that is originally fully miscible such as water and methyl acetate can be formed into two phases by adding a salt.

Step 2

In Step 2 of the method for producing cellulose beads according to an embodiment of the present disclosure, by supplying the cellulose solution to the first liquid medium phase of the aforementioned coagulating bath, a particulate cellulose solution is formed in the first liquid medium phase. The liquid medium constituting the first liquid medium phase is as described above.

Furthermore, the cellulose solution to be supplied to the first liquid medium phase is not particularly limited as long as the cellulose solution is low in miscibility with the liquid medium constituting the first liquid medium phase, and coagulates to form cellulose when contacted with the liquid medium constituting the second liquid medium phase described above. Examples include cellulose solutions obtained by dissolving cellulose in the following solvents: known cellulose solvents selected from dimethylacetamide containing lithium chloride, a copper ammonia hydroxide aqueous solution, an ionic liquid, a quaternary ammonium hydroxide aqueous solution, an alkali hydroxide aqueous solution containing urea or thiourea, or an alkali hydroxide aqueous solution. From the perspectives of low cost and the ability to select a wide variety of first liquid medium phases, a cellulose solution obtained by dissolving cellulose in an alkali hydroxide aqueous solution containing urea or thiourea or in an alkali hydroxide aqueous solution not containing urea or thiourea is preferable. Note that, here, the term "solution" refers to a solution that contains a certain amount of cellulose, exhibits fluidity, and solidifies when contacted with a coagulating liquid (second liquid medium), and may be a molecularly dispersed solution or a solution in which some associations remain, or may be merely a solution in which fine fibrous substances are simply dispersed (sometimes referred to as dispersion).

The preparation of the cellulose solution will be described in detail below for a case in which a urea-alkali hydroxide aqueous solution is used as the solvent.

The alkali contained in the alkali hydroxide aqueous solution is preferably lithium hydroxide, sodium hydroxide, potassium hydroxide, or quaternary ammonium hydroxide, and sodium hydroxide is most preferable from the perspectives of product safety, price, and good dissolution or dispersibility.

The alkali concentration of the alkaline aqueous solution is not particularly limited, but is preferably from 3 to 20 mass %. If the concentration of the alkali is within this range, the dispersibility, swelling property, and solubility of the cellulose in the alkaline aqueous solution are high, and thus such a concentration is preferable. The concentration of alkali is more preferably from 5 to 15 mass %, even more preferably from 7 to 10 mass %, and most preferably from 8 to 10 mass %.

Urea or thiourea is further added to the aqueous alkaline solution, and the concentration of urea or thiourea in this case is preferably from 10 to 15%. Three components (cellulose, alkali hydroxide, and urea or thiourea) are added to the water, and the order of addition is appropriately selected to optimize the dissolution state of the cellulose. Further, a transparent cellulose solution can be obtained by cooling, under below-described conditions, the slurry thus obtained.

Note that in Patent Document 1, a white turbid liquid in which cellulose is dispersed in an alkaline aqueous solution not containing urea is defined as a "cellulose dispersion", and Patent Document 1 also discloses that this cellulose dispersion may also be used as a raw material for beads. However, the present disclosure cannot be applied to this type of system as long as there is a moderate level of fluidity. Hereinafter, the term cellulose solution refers to a solution that contains 10 mass % or less of cellulose, is capable of flowing, and coagulates under appropriate conditions, and it does not matter whether the cellulose in the liquid is molecularly dispersed or is in an associated state, or the like. That is, in the method for producing cellulose beads according to an embodiment of the present disclosure, a cellulose solution refers to a liquid containing cellulose, and is a concept that includes a dispersion in which cellulose is dispersed in a liquid, and a solution in which cellulose is dissolved in a liquid. In the method for producing cellulose beads according to an embodiment of the present disclosure, cellulose needs only be included in the cellulose solution, and in terms of the form, it may be dispersed or dissolved, or in a mixed state of the dispersed and dissolved.

The cellulose may be any cellulose as long as the cellulose solution forms droplets and the cellulose can be returned to a solid through coagulation. However, from perspectives such as excelling in solubility, and ease of handling with low viscosity of the solution, so-called microcrystalline cellulose that has been subjected to mild acid hydrolysis, cellulose that has been regenerated through deacetylation from cellulose acetate, and cellulose such as rayon fibers are preferable.

The molecular weight of the cellulose is not particularly limited, but the degree of polymerization is preferably not greater than 1000. If the degree of polymerization is less than or equal to 1000, dispersibility and swelling properties in an alkaline aqueous solution are high, and thus such a degree of polymerization is preferable. If the degree of polymerization is greater than or equal to 10, the mechanical strength of the obtained cellulose beads is increased, and thus such a degree of polymerization is preferable. The range of the degree of polymerization is more preferably from 50 to 500, even more preferably from 100 to 400, and particularly preferably from 150 to 300.

Another example of cellulose with improved solubility is dissolved pulp.

The conditions for mixing the alkaline aqueous solution and the cellulose are not particularly limited as long as a cellulose solution is obtained. For example, cellulose may be added to an alkaline aqueous solution, or an alkaline aqueous solution may be added to the cellulose.

The cellulose may be suspended in water prior to mixing with the alkaline aqueous solution.

In addition, the concentration of cellulose in the cellulose solution is preferably from 1 to 10 mass %. A concentration of 1 mass % or greater is preferable because the mechanical strength of the obtained beads increases, and a concentration of not greater than 10 mass % is preferable because the viscosity of the cellulose solution is low and supplying the cellulose solution to the first liquid medium phase is facilitated. The concentration of cellulose is more preferably from 2 to 6 mass %, and even more preferably from 3 to 5 mass %. Note that the cellulose concentration in the cellulose solution does not include the portion that does not become uniform and is not completely dissolved, dispersed, or swollen.

The temperature at which the cellulose solution is prepared is not particularly limited, but for example, a cellulose solution is suitably formed by mixing cellulose with an alkaline aqueous solution containing urea or thiourea at room temperature, cooling to a low temperature while stirring, and then returning the mixture to a manageable temperature. Examples of the temperature when cooling to a low temperature include from around 0° C. to −30° C., and preferably from around −5° C. to −15° C. Note that when supplying the cellulose solution to the first liquid medium phase, from the perspective of lowering the viscosity of the cellulose solution and facilitating the supply of the cellulose solution to the first liquid medium phase, the temperature of the cellulose solution is, for example, from around −10° C. to 40° C., and preferably from around 10° C. to 30° C. Furthermore, the temperature of the first liquid medium phase at this time can be set to the same temperature as the temperature of the cellulose solution, and in order to optimize the microstructure, the temperature may be in a range from −10° C. to 50° C., and may be a different temperature between the freezing point and the boiling point of the first liquid medium phase.

The diameter of the cellulose solution supplied to the first liquid medium phase can be appropriately adjusted according to the size of the targeted cellulose beads, and for example, may be from 10 to 1000 μm, and preferably from 20 to 200 μm.

The method for supplying the cellulose solution to the first liquid medium phase is not particularly limited, but from the perspective of suitably forming a particulate cellulose solution in the first liquid medium phase, the cellulose solution is preferably supplied from the tip of a nozzle to the first liquid medium phase. The diameter and shape of a discharge hole are not limited as long as the cellulose solution is discharged, and droplets of the cellulose solution are formed in the first liquid medium phase. Regarding the shape of the tip of the nozzle, the opening of the tip preferably has a circular diameter. Furthermore, the diameter of the discharge hole may be appropriately adjusted according to the size of the targeted cellulose beads, and for example, the diameter may be from 10 to 500 μm and is preferably from 50 to 200 μm.

In addition, after a discharged liquid column has been spontaneously formed into droplets in a gas phase in air or an inert gas, the tip of the nozzle may drop the droplets thereof into the first liquid medium phase, and more preferably, from the perspective of suitably forming a particulate cellulose solution in the first liquid medium phase, the cellulose solution is preferably discharged from the nozzle while the tip of the nozzle is present in the first liquid medium phase. Note that the cellulose solution can be discharged from the nozzle by supplying the cellulose solution under pressure to the nozzle. If necessary, droplet formation can be further facilitated by using a double-tube nozzle, and passing the cellulose solution from the inner tube and the first liquid medium phase or a liquid that is mixed therewith from the outer tube.

Furthermore, from the perspective of suitably forming a particulate cellulose solution in the first liquid medium phase, when the cellulose solution is discharged from the nozzle, a gas is desirably not discharged from the nozzle (assistance through gas flow is not used). That is, when a gas is discharged from the nozzle, turbulent flow (stirring) occurs in the gas flow or the first liquid medium phase, and adversely affects the shape of the cellulose particles and the uniformity of the particle diameter.

In order to discharge droplets of the cellulose solution from the nozzle without using a gas, in addition to simply discharging a liquid column through pressurization and inducing spontaneous division through interfacial tension, a technique of an ordinary sprayer can be adopted in which a spiral motion is applied to the cellulose solution in the nozzle, and droplets are formed through centrifugal force, or the liquid can be intermittently discharged using the principle of an inkjet nozzle, or ultrasonic vibration can be applied to the nozzle to facilitate the division of the liquid column.

In the method for producing cellulose beads according to an embodiment of the present disclosure, droplets of the cellulose solution are discharged from the nozzle, and thereby it is not necessary to use a gas supply system to form droplets of the cellulose solution. As a result, a mist is not generated, and the particle diameter distribution of the cellulose solution that is formed can be reduced. In addition, since an exhaust treatment system is not necessary, the device can also be easily simplified. Furthermore, cellulose beads can be produced with high uniformity because there is no turbulence generated by airflow spraying.

As described above, the specific gravities of the cellulose solution, the first liquid medium phase, and the second liquid medium phase are adjusted, and in the coagulating bath 3, the first liquid medium phase 1 forms an upper layer, the second liquid medium phase 2 forms a lower layer, and the cellulose solution 10 supplied to the first liquid medium phase is freely dropped through gravitational force, forms particles in the first liquid medium phase, and can be moved to the second liquid medium phase.

Step 3

In Step 3 of the method for producing cellulose beads according to an embodiment of the present disclosure, by supplying the particulate cellulose solution of the first liquid medium phase to the second liquid medium phase, the particulate cellulose solution is coagulated. The liquid medium constituting the second liquid medium phase is as described above.

When the particulate cellulose solution formed in Step 2 is supplied to the second liquid medium phase, the particulate cellulose solution contacts the liquid medium of the second liquid medium phase, and the cellulose coagulates to form cellulose beads. As described above, the cellulose beads thus formed are usually porous.

As also indicated above, when the specific gravities of the cellulose solution, the first liquid medium phase, and the second liquid medium phase are adjusted, and the first liquid medium phase 1 forms an upper layer, and the second liquid medium phase 2 forms a lower layer in the coagulating bath 3, the particulate cellulose solution 10 formed in the first liquid medium phase can be freely dropped by gravitational force, supplied to the second liquid medium phase, and coagulated to produce cellulose beads.

When the cellulose solution is supplied to the second liquid medium phase, the optimal temperature for the targeted quality may be selected within a range of from −10 to 50° C. at which the likelihood of freezing or modification of the cellulose solution is low, and within a range from the freezing point to the boiling point of the first liquid medium phase and the second liquid medium phase. In addition, although it is easiest to set the first liquid medium phase and the second liquid medium phase to the same temperature, a temperature gradient may be intentionally provided within the possible range of temperatures.

In the method for producing cellulose beads according to an embodiment of the present disclosure, from the perspective of suitably producing spherical cellulose beads, in Step 2 and Step 3, the first liquid medium phase and the second liquid medium phase are preferably in a stationary state, but weak stirring at a speed of 1 rpm or less can be added to mitigate changes in the medium composition or solid content due to the addition of the cellulose solution. When the first liquid medium phase and the second liquid medium phase are strongly stirred, the shape of the cellulose solution is modified, and as result, the production of irregular cellulose beads is facilitated.

The diameter of the cellulose beads obtained by the production method according to an embodiment of the present disclosure is appropriately adjusted according to the purpose, and the diameter may be, for example, from 10 to 5000 μm, and preferably from 20 to 1000 μm.

In the production method according to an embodiment of the present disclosure, spherical cellulose beads can be continuously produced by continuously supplying the cellulose solution to the first liquid medium phase and the second liquid medium phase.

Furthermore, if the first liquid medium phase, the second liquid medium phase, and the generated beads are appropriately extracted and replenished, the cellulose beads can be continuously produced for an even longer period of time. In addition, once the cellulose solution has been prepared, there are no restrictions on the dispersion medium or addition of a dispersion stabilizer required when coagulating the cellulose solution, and this elimination of restrictions also leads to a facilitation of post-treatments.

The obtained cellulose beads can be washed through a suitable method using water or an alcohol such as methanol or ethanol, and can usually be stored in a wet state. When the cellulose beads are to be dried, an appropriate amount of saccharides, glycerin, or the like is added. In the case of long-term storage in a wet state, a preservative such as an alcohol or sodium azide is added to prevent spoilage. In addition, the cellulose beads to which glycerin, a saccharide, urea, or the like has been added can be dried.

When the cellulose beads (particulate cellulose medium) obtained by the production method according to an embodiment of the present disclosure are porous cellulose beads, cellulose beads having a substantially spherical to spherical shape with a particle diameter (maximum diameter) of approximately from 10 μm to 300 μm can be sorted, as necessary, through a known and appropriate classification technique, and can be used as a filler for chromatography, for example. An example of chromatography can include size exclusion chromatography.

The ability to use the cellulose beads in size exclusion chromatography indicates that by bonding an appropriate ligand, the cellulose beads can also be used in chromatography separation through various modes besides size exclusion. These other modes include modes such as ion exchange chromatography, hydrophobic interaction chromatography, and affinity chromatography.

In general, for the separation and purification of useful molecules produced through biotechnology, such as, for example, hormones, enzymes, and antibodies, a matrix having pores of a size that allows sufficient entry of these substances is preferable. That is, when gel filtration chromatography is implemented using a column packed with porous cellulose beads and using water as the mobile phase, fractionation desirably occurs in a certain molecular weight range of generally from 103 to 107 when converted into the molecular weight of polyethylene glycol.

The size of the pores of the porous cellulose beads can be adjusted through the type, composition, temperature conditions, and the like of the liquid media constituting the cellulose solution, the first liquid medium phase, and the second liquid medium phase.

In the present disclosure, an adsorbent can be produced by fixing an affinity ligand to a porous cellulose bead obtained by the production method described above. That is, the method for producing cellulose beads according to an embodiment of the present disclosure can further include a step of fixing an affinity ligand so as to produce an adsorbent to which an affinity ligand is bound. The adsorbent can also be used as a separating agent for affinity chromatography.

EXAMPLES

The present disclosure will be described below in detail by presenting an example and a comparative example. However, the present disclosure is not limited to this example.

Preparation of Cellulose Solution

An amount of 1.92 g of a cellulose powder (KC Flock 200G powdered cellulose available from Nippon Paper Industries Co., Ltd.) was dispersed in a solution obtained by dissolving 4.45 g of sodium hydroxide in 51.5 g of water. In addition, 7.64 g of urea was added thereto and stirred. When the resulting slurry was cooled to −15° C. while stirring, a viscous slurry was obtained. The viscous slurry was gradually warmed to room temperature once again, after which the undissolved fibers were allowed to settle using a centrifuge (20° C., 10000 rpm, 30 min), and the supernatant was decanted and separated. Subsequently, 0.35 g of this supernatant was added dropwise to methanol, neutralized with an appropriate amount of acetic acid, and washed with water, and a cellulose solution containing 9.3 mg of cellulose was recovered (cellulose concentration in dispersion: 2.7 mass %).

Example 1: Production of Cellulose Beads

When a 1 L graduated cylinder was used as a coagulating bath, and 500 mL of hexane and 400 mL of methanol were inserted into the coagulating bath, two layers were formed with the hexane (first liquid medium phase) positioned as an upper layer and the methanol (second liquid medium phase) positioned as a lower layer. Meanwhile, the cellulose solution obtained above was inserted into a pressure resistant container having upper and lower inlet/outlet ports, liquid paraffin was injected from the upper port using a liquid delivery pump for liquid chromatography, and the cellulose solution was derived from the lower port by this pressure, and was slowly discharged from a stainless steel nozzle (tip inner diameter: 100 μm). The tip of the stainless steel nozzle was present in the hexane of the upper layer. Droplets were continuously formed from the tip of the stainless steel nozzle, and the droplets gradually settled in the hexane, moved to the methanol layer, and were finally precipitated as particles. The obtained particles were washed with water and then observed with an electron microscope, and as illustrated in FIG. 1, it was confirmed that the generated particles were almost perfectly circular, and the particle diameters were relatively uniform.

Comparative Example 1: Production of Cellulose Beads

Figure 2:
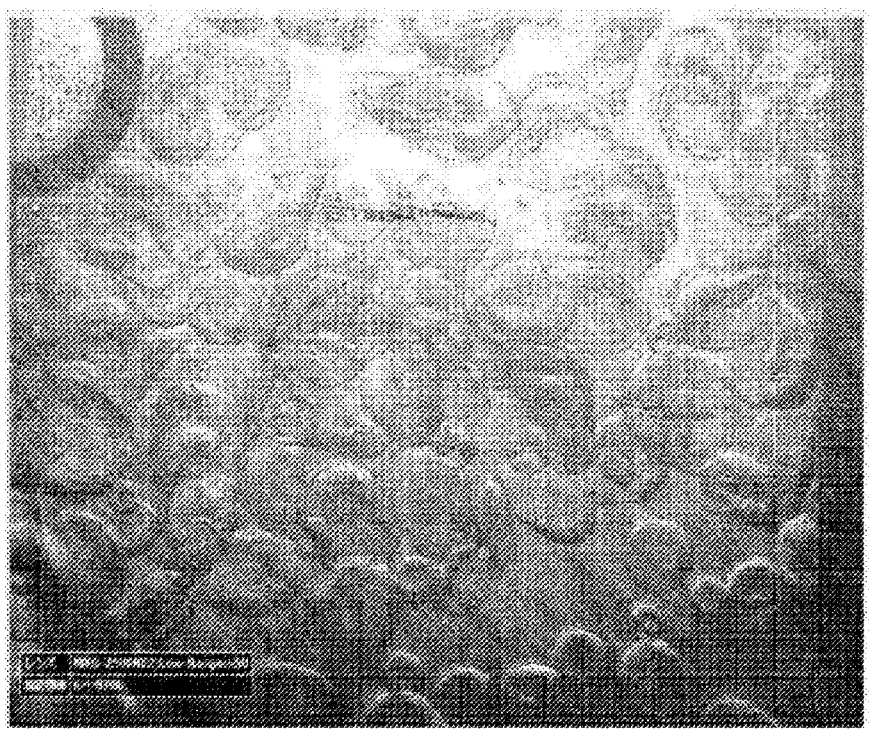
FIG. 2 is an electron micrograph image of cellulose beads obtained in Comparative Example 1.

Cellulose beads were produced with the same method as in Example 1 with the exception that the cellulose solution was discharged from the tip of the stainless steel nozzle without providing a hexane layer as an upper layer in the coagulating bath, and the cellulose solution was added dropwise to the methanol layer positioned approximately 20 cm below. The particles that precipitated into the methanol layer were washed with water, and then observed with an electron microscope, and as illustrated in FIG. 2, it was confirmed that most of the produced particles had an irregular shape.

The invention claimed is:
1. A method for producing cellulose beads comprising:
(Step 1) preparing a coagulating bath having a first liquid medium phase and a second liquid medium phase;

(Step 2) forming a particulate cellulose solution in the first liquid medium phase by supplying a cellulose solution to the first liquid medium phase of the coagulating bath;

(Step 3) coagulating the particulate cellulose solution to produce cellulose beads by supplying the particulate cellulose solution in the first liquid medium phase to the second liquid medium phase; and said cellulose beads have a particle diameter of 10 μm to 300 μm.

2. The method for producing cellulose beads according to claim 1, wherein the first liquid medium phase and the second liquid medium phase are in contact with one another in the coagulating bath.

3. The method for producing cellulose beads according to claim 1, wherein Step 2 and Step 3 are implemented simultaneously.

4. The method for producing cellulose beads according to claim 1, wherein in Step 2, the cellulose solution is supplied from a tip of a nozzle to the first liquid medium phase.

5. The method for producing cellulose beads according to claim 4, wherein the tip of the nozzle is present in the first liquid medium phase.

6. The method for producing cellulose beads according to claim 1, wherein
   in the coagulating bath, the first liquid medium phase is an upper layer, and the second liquid medium phase is a lower layer; and
   in Step 3, the particulate cellulose solution in the first liquid medium phase is supplied to the second liquid medium phase through gravitational force.

7. A method for producing cellulose beads comprising:
(Step 1) preparing a coagulating bath having a first liquid medium phase and a second liquid medium phase;
(Step 2) forming a particulate cellulose solution in the first liquid medium phase by supplying a cellulose solution to the first liquid medium phase of the coagulating bath; and
(Step 3) coagulating the particulate cellulose solution by supplying the particulate cellulose solution in the first liquid medium phase to the second liquid medium phase; and
wherein said cellulose solution has low miscibility with respect to said first liquid medium phase; and
wherein said coagulated cellulose beads have a particle diameter of 10 μm to 300 μm.

8. A method for producing cellulose beads comprising:
(Step 1) preparing a coagulating bath having a first liquid medium phase and a second liquid medium phase;
(Step 2) forming a particulate cellulose solution in the first liquid medium phase by supplying a cellulose solution to the first liquid medium phase of the coagulating bath; and
(Step 3) coagulating the particulate cellulose solution by supplying the particulate cellulose solution in the first liquid medium phase through gravitational force to the second liquid medium phase to produce coagulated cellulose beads;
wherein said cellulose solution has low miscibility with respect to said first liquid medium phase; and
wherein said coagulated cellulose beads have a particle diameter of 10 μm to 300 μm.

\* \* \* \* \*